United States Patent [19]

Kawada et al.

[11] Patent Number: 4,796,352
[45] Date of Patent: Jan. 10, 1989

[54] AC SERVOMOTOR AND A METHOD OF MANUFACTURING THE SAME

[75] Inventors: Shigeki Kawada; Yoichi Amemiya; Masatoyo Sogabe, all of Hachioji; Noboru Iwamatsu, Hino, all of Japan

[73] Assignee: Fanuc Ltd., Yamanashi, Japan

[21] Appl. No.: 51,268

[22] Filed: May 13, 1987

Related U.S. Application Data

[62] Division of Ser. No. 772,600, filed as PCT JP84/00829 on Dec. 28, 1984, published as WO85/03172 on Jul. 18, 1985, abandoned.

[30] Foreign Application Priority Data

Dec. 29, 1983 [JP] Japan ............... 58-247742

[51] Int. Cl.⁴ .......................... H02K 15/14
[52] U.S. Cl. ........................ 29/596; 310/42; 310/89; 310/90; 310/254
[58] Field of Search ............... 29/596, 598; 310/254, 310/42, 89, 90

[56] References Cited

U.S. PATENT DOCUMENTS

| | | | |
|---|---|---|---|
| 2,039,456 | 5/1936 | Sammarone | 310/90 X |
| 2,602,098 | 7/1952 | Ross et al. | 310/89 |
| 3,031,973 | 5/1962 | Kraemer | 310/90 |
| 3,200,275 | 7/1965 | Lindgren | 310/90 |
| 3,209,434 | 10/1965 | Anderson, Jr. | 29/596 |
| 3,493,794 | 2/1970 | Hickle | 310/259 |
| 3,512,024 | 5/1970 | Papa | 310/259 |
| 3,871,069 | 3/1975 | Greib | 29/596 |
| 4,528,490 | 7/1985 | Hansen | 318/560 |
| 4,562,641 | 1/1986 | Mosher et al. | 29/598 |

FOREIGN PATENT DOCUMENTS

| | | |
|---|---|---|
| 53-53084 | 5/1978 | Japan . |
| 129761 | 11/1978 | Japan . |
| 65-26544 | 6/1981 | Japan . |
| 57-25794 | 6/1982 | Japan . |

OTHER PUBLICATIONS

Kikai Kogaku Zensho, "Taretto Katsuyo Jiten", 1 Jul. 62, vol. 1, pp. 202-203, p. 301.

*Primary Examiner*—Carl E. Hall
*Attorney, Agent, or Firm*—Armstrong, Nikaido, Marmelstein & Kubovcik

[57] ABSTRACT

In an AC servomotor constructed so that the outer circumference (21b) of a stator core (21) formed by laminating thin steel plates (22) is used as part of a motor housing, bearing mounting bores (25a, 26a) for receiving bearing members (27, 28) to be mounted on a pair of brackets (25, 26) attached to the front and rear ends of the stator core (21) and mounting surfaces (25b, 25c) of the motor are formed with accurate concentricity and squareness with reference to the center bore (21a) and the outer circumference (21b) of the stator core (21) after firmly joining the brackets (25, 26) to the stator core (21). Thus, a rotor (29) is supported with high accuracy in concentricity with the stator core (21) on the brackets (25, 26) and the squareness of the output shaft (29a) to the mounting surfaces (25b, 25c) is established.

3 Claims, 1 Drawing Sheet

AC SERVOMOTOR AND A METHOD OF MANUFACTURING THE SAME

This application is a division of application Ser. No. 772,600 filed as PCTJP84/00829 on Dec. 28, 1984, published as WO85/03172 on Jul. 18, 1985 now abandoned.

TECHNICAL FIELD

The present invention relates to a method of manufacturing an AC servomotor.

BACKGROUND ART

An AC servomotor employing the outer circumference of a stator core formed by laminating magnetic steel plates as part of a motor housing has hithertofore been known. This AC servomotor is a synchronous motor having a rotor provided with field poles formed by permanent magnets and disposed inside a stator or an induction motor having a rotor provided with coils. When such a motor is used as a servomotor, particularly high mechanical accuracy is required, for example, in the concentricity of the rotor with the stator and the concentricity of a motor output shaft attached to the rotor with and the squareness of the same to the motor mount of a driven body, such as a machine tool.

Referring to FIG. 1, a conventional AC servomotor of this kind comprises a stator core 1 having laminated thin steel plates 2, stator coils 3 wound on the stator core 1, a pair of brackets 4 and 5 firmly fixed to the opposite ends of the stator core 1, respectively, with bolts or the like, and a rotor 8 supported rotatably in bearing members 6 and 7 on the brackets 4 and 5. The AC servomotor of such a construction requires a high mechanical accuracy in the concentricity of the rotor 8 with the stator 1 to enable the rotor 8 to rotate smoothly. A high mechanical accuracy is required also in the concentricity of an output shaft 8a fixed to the rotor 8 with and the squareness of the same to a motor mount 9a of a machine tool 9 or the like.

However, since the machining of the stator core 1 and the brackets 4 and 5 of the conventional AC servomotor of this kind is completed before they are joined firmly together, the final accuracy of the above-mentioned concentricity is deteriorated greatly by the accumulation of errors in respective elements and parts when the stator core 1 and the brackets 4 and 5 are assembled. Furthermore, since the stator core 1 and the brackets 4 and 5 are machined before they are assembled, the joining parts of the stator core 1 and the brackets 4 and 5 must be finished with a high mechanical accuracy, which increases precision machining work. Still further, the stator core 1 itself needs to be extremely firm and rigid and separate thick end plates 10 and 11 need to be provided at the opposite ends, respectively, of the laminated thin steel plates of the stator core 1, as illustrated in FIG. 1, in order to finish the joining surfaces of the stator core 1 to contact the brackets with a high accuracy. Such a construction requires annular mounting surface-to be joined to the brackets to be formed in the outer surfaces of the end plates 10 and 11, respectively, which disadvantageously increases the manufacturing cost of the stator and increases work for manufacturing the same.

DISCLOSURE OF THE INVENTION

It is an object of the present invention to provide an AC servomotor with a high mechanical accuracy, constructed so that the outer circumference of the stator core thereof is used as part of the motor housing.

It is another object of the present invention to provide a method of manufacturing an AC servomotor with a high mechanical accuracy at the lowest possible cost and reduced manufacturing work.

In accordance with one aspect of the present invention, there is provided an AC servomotor comprising: a stator core formed by laminating magnetic steel plates having slots for receiving coils therein and having outer and inner circumferences capable of serving as datum surfaces; stator coils received in the slots of the stator core; a pair of brackets joined firmly to the axial opposite ends of the stator core respectively and each having at least a bearing member mounting bore and an outer mounting surfaces which are formed with an accurate concentricity with and with an accurate squareness with respect to the datum surfaces of the stator core; and a rotor supported rotatably in bearing members on the brackets.

In accordance with another aspect of the present invention, there is provided a method of manufacturing an AC servomotor, comprising the steps of: forming a stator core having a center bore by laminating magnetic steel plates having slots for receiving coils; selecting at least either the inner surface of the center bore or the outer circumference of the stator core as a datum surface; loading stator coils in the stator core before or after the selection of the datum surface; firmly joining a pair of brackets to the axial opposite ends of the stator core respectively for rotatably supporting a rotor in bearing members; machining the brackets to form bearing member mounting bores therein concentrically with the datum surface of the stator core and to form mounting surfaces therein perpendicularly to the datum surface; and supporting a rotor for rotation relative to the stator core in bearing members fit in the bearing member mounting bores o±the brackets.

BEST MODE FOR CARRYING OUT THE INVENTION

Figure 1:
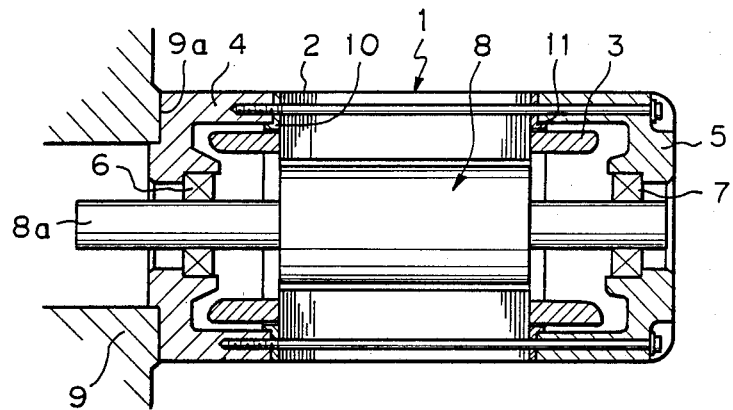
FIG. 1 is a longitudinal sectional view showing a construction of a conventional AC servomotor.
Figure 2:
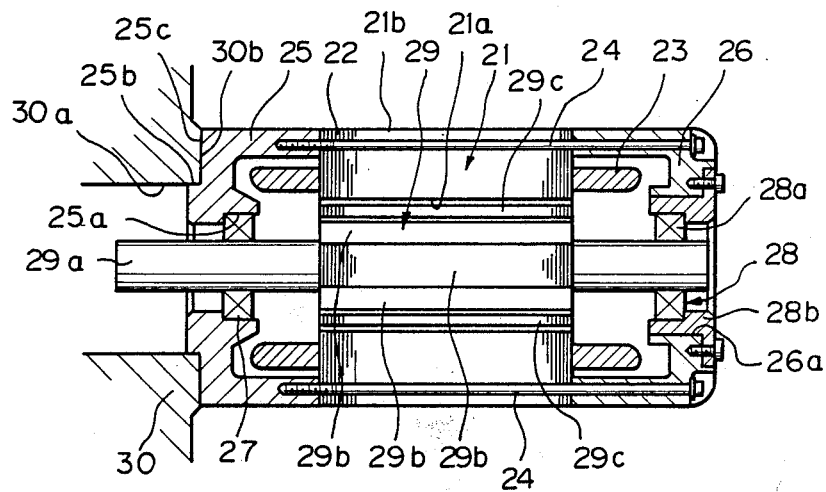
FIG. 2 is a longitudinal sectional view of an AC servomotor, in a preferred embodiment, according to the present invention.

Referring to FIG. 2, a permanent magnet field pole synchronous motor for use as an AC servomotor has a stator core 21 consisting of a plurality of laminated steel plates 22, stator coils 23 loaded into the stator core 21 in a well-known manner, a pair of brackets 25 and 26 joined firmly to the opposite ends of the stator core 21, and a rotor 29 supported rotatably in bearing members 27 and 28 on a pair of the brackets 25 and 26.

Careful consideration is given to the design and machining of the stator core 21 so that the inside diameter of the center bore 21a and the outside diameter of the outer circumference 21b of the stator core 21 vary within fixed tolerances respectively when the steel sheets are punched out and laminated. However, the center bore 21a and the outer circumference 21b may be precisely finished through grinding or the like, if necessary.

The constitution of the rotor 29 is the same as that of a synchronous motor, in which permanent magnets 29b and yokes 29c are disposed alternately along the circumferential direction on an output shaft 29a. However, when the present invention is applied to an induction motor to be used as an AC servomotor, a rotor provided with coils is employed.

Supporting surfaces 25a and 26a formed in the brackets 25 and 26 respectively for supporting the bearing members 27 and 28, and outer mounting surfaces 25b and 25c to be joined to the motor mounting surfaces 30a and 30b of a machine tool 30 or the like are formed by machining the brackets 25 and 26 with reference to the outer circumference 21b of the stator core 21 after firmly joining the laminated core 21 and the brackets 25 and 26 with the bolts 24. Accordingly, the concentricity of the stator core 21 with the rotor 29, the concentricity of the output shaft 29a of the rotor 29 with the motor mounting surface 30a of the machine tool 30, and the squareness of the output shaft 29a of the rotor 29 to the motor mounting surface 30b of the machine tool 30 are dependent only on machining accuracy. Hence, errors in the stator core 21 and the brackets 25 and 26 will not accumulate when the stator core 21, the rotor 29, and the brackets 25 and 26 are assembled.

A method of manufacturing an AC servomotor of the above-mentioned constitution will be described hereinafter.

First, the stator core 21 is formed by laminating a plurality of steel plates 22, each having a hole formed in the central portion thereof for receiving the rotor 29 therein and slots for receiving coils. The stator core is loaded with the stator coils 23. Then, a pair of the brackets 25 and 26 are joined firmly to the opposite ends of the stator core 21 with the bolts 24. Then, the brackets 25 and 26 are machined with reference to the inner surface of the center bore 21a or the outer circumference 21b of the stator core 21 to form the supporting surfaces 25a and 26a for supporting the bearing members 27 and 28 and the outer mounting surfaces 25b and 25c to be joined to motor mounting surfaces 30a and 30b of the machine tool 30. The mounting surface 25b is a cylindrical mounting surface concentric with the reference or datum surface and the outer mounting surface 25c is perpendicular to the reference surfaces. The rotor 29 is supported rotatably in the bearing members 27 and 28 on a pair of the brackets 25 and 26.

The stator core 21 may be subject to a preliminary fixing treatment to obviate the deformation of the same before firmly joining a pair of the brackets 25 and 26 to the opposite ends of the stator core 21. The preliminary fixing treatment may be made by an adhesive, welding or fastening.

In the described AC servomotor, the stator core 21 and the brackets 25 and 26 are joined firmly together with the bolts 24, however, the stator core 21 and the brackets 25 and 26 may be welded together at the outer surfaces thereof.

Since the rotor 29 is mounted on the brackets after firmly joining the brackets 25 and 26 to the stator core 21, the inside diameter of at least one of the brackets (the bracket 26 in this case) is greater than the outside diameter of the rotor 29. In this AC servomotor, the bearing member 28 mounted in the bracket 26 consists of a bearing 28a and a holder 28b to be screwed to the bracket 26, however, the holder can be omitted by using a bearing having a large outside form.

After firmly joining the brackets 25 and 26 to the core 21, the portions necessary to be machined with a mechanical accuracy are machined precisely by using jigs such as a centering jig. Therefore, the joining portions of the core 21 and the brackets 25 and 26 need not be finished beforehand with a high accuracy. If desired, comparatively thick end plates may be provided on the opposite ends of the laminated steel plates of the stator core 21 to form annular joining surfaces therein to attach the brackets 25 and 26 thereto. However, since the laminated core 21 and the brackets need to be merely joined firmly, such end plates can be omitted.

According to the above-mentioned method of manufacture, the stator core 21 itself need not be brought into a solid state before firmly joining together the stator core 21 and the brackets 25 and 26, so the process for manufacturing the stator core 21 can be simplified. Furthermore, the associated joining surfaces of the stator core 21 and the brackets 25 and 26 need not be machined precisely before joining together the stator core 21 and the brackets 25 and 26, and, hence, machining work is reduced.

We claim:

1. A method of manufacturing an AC servomotor, comprising the steps of: laminating a plurality of magnetic steel plates to form a stator core having a center bore and slots for receiving coils; selecting at least one datum surface comprised of either the inner surface of said center bore or the outer circumference of said stator core ; loading stator coils in said stator core slots; securing a pair of brackets to the axial opposite ends of said stator core respectively to provide an assembly for rotatably supporting a rotor in bearing members thereon; machining each of said brackets to form bearing member mounting bores therein concentric with said selected datum surface of said stator core to form an outer mounting surface on one of said brackets which is perpendicular to said selected datum surface of said stator core; and rotatably supporting a rotor and shaft internally of said stator core center bore, said shaft being rotatably mounted in bearing members fit to said bearing member mounting bores of said brackets whereby said rotor and shaft will be concentric with said selected datum surface of said stator core and normal to said outer mounting surface.

2. A method of manufacturing an AC servomotor according to claim 1, further comprising the step of fixing said magnetic steel plates of said stator core by preliminary fixing means after laminating said magnetic steel plates to obviate the deformation of said stator core.

3. A method of manufacturing an AC servomotor according to claim 1 further comprising the step of machining said one bracket to form an additional outer mounting surface concentric with said selected datum surface and normal to said one outer mounting surface.

* * * * *